(12) United States Patent
Chae et al.

(10) Patent No.: US 12,537,470 B2
(45) Date of Patent: Jan. 27, 2026

(54) MOTOR DRIVING APPARATUS AND METHOD OF CONTROLLING THE SAME

(71) Applicants: Hyundai Motor Company, Seoul (KR); Kia Corporation, Seoul (KR)

(72) Inventors: Young Ho Chae, Gwangmyeong-si (KR); Young Kwan Ko, Seoul (KR); Hyun Jae Lim, Hwaseong-si (KR); Young Gi Lee, Ansan-si (KR); Joo Young Park, Yongin-si (KR); Yong Jae Lee, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 151 days.

(21) Appl. No.: 18/512,300

(22) Filed: Nov. 17, 2023

(65) Prior Publication Data

US 2025/0030369 A1 Jan. 23, 2025

(30) Foreign Application Priority Data

Jul. 20, 2023 (KR) ........................ 10-2023-0094722

(51) Int. Cl.
| | | |
|---|---|---|
| H02M 7/5395 | (2006.01) | |
| H02M 7/537 | (2006.01) | |
| H02P 25/22 | (2006.01) | |
| H02P 27/08 | (2006.01) | |
| H02P 6/08 | (2016.01) | |

(52) U.S. Cl.
CPC .......... *H02P 27/085* (2013.01); *H02M 7/537* (2013.01); *H02P 25/22* (2013.01); *H02P 6/08* (2013.01)

(58) Field of Classification Search
CPC .......... H02M 7/53871; H02M 7/5395; H02M 7/537; H02P 25/22; H02P 27/085; H02P 21/0089; H02P 6/08
USPC ........................................................ 318/701
See application file for complete search history.

(56) References Cited

U.S. PATENT DOCUMENTS

| | | | |
|---|---|---|---|
| 10,673,366 B2* | 6/2020 | Suzuki | .................... H02P 27/08 |
| 12,034,392 B2* | 7/2024 | Lee | ......................... H02P 27/08 |
| 2019/0296665 A1* | 9/2019 | Matsubara | ................ H02P 6/12 |

(Continued)

FOREIGN PATENT DOCUMENTS

| | | |
|---|---|---|
| EP | 4224703 A1 | 8/2023 |
| JP | 6331791 B2 | 5/2018 |

(Continued)

*Primary Examiner* — Gabriel Agared
(74) *Attorney, Agent, or Firm* — Morgan, Lewis & Bockius LLP

(57) ABSTRACT

A motor driving apparatus includes a motor having a plurality of windings, a dual inverter including a first inverter connected to first ends of the plurality of windings and a second inverter connected to second ends of the plurality of windings and configured to drive the motor through at least one of the first inverter or the second inverter according to a motor driving mode, and a controller configured to determine whether flux weakening control is performed according to an available voltage level of the dual inverter when a switching condition of the motor driving mode is satisfied and to perform the flux weakening control by linearly adjusting an output voltage level of the dual inverter for a preset time interval for which the flux weakening control is performed.

18 Claims, 5 Drawing Sheets

(56) References Cited

U.S. PATENT DOCUMENTS

| | | | | |
|---|---|---|---|---|
| 2021/0305928 A1* | 9/2021 | Jeong | .................... | B60L 15/007 |
| 2021/0384863 A1* | 12/2021 | Omata | .................... | H02P 25/22 |
| 2022/0352838 A1* | 11/2022 | Jeong | ............... | H02M 7/53871 |
| 2023/0073159 A1* | 3/2023 | Lee | ......................... | H02P 27/06 |
| 2023/0208339 A1* | 6/2023 | Kanamori | ............. | H02P 27/085 |
| | | | | 318/811 |
| 2023/0253905 A1 | 8/2023 | Yu et al. | | |

FOREIGN PATENT DOCUMENTS

| | | |
|---|---|---|
| KR | 10-2016-0111632 A | 9/2016 |
| KR | 10-2021-0050555 A | 5/2021 |
| KR | 10-2023-0119923 A | 8/2023 |
| KR | 10-2024-0044128 A | 4/2024 |

* cited by examiner

MOTOR DRIVING APPARATUS AND METHOD OF CONTROLLING THE SAME

CROSS REFERENCE TO RELATED APPLICATION

The present application claims the benefit of priority to Korean Patent Application No. 10-2023-0094722 filed on Jul. 20, 2023 in the Korean Intellectual Property Office, the entire contents of which is incorporated herein for all purposes by this reference.

TECHNICAL FIELD

The present disclosure relates to a motor driving apparatus and a method of controlling the same, and more specifically, to a motor driving apparatus for stabilizing a torque output from a motor upon switching a motor driving mode and a method of controlling the same.

BACKGROUND

Recently, as a motor driving technology capable of improving system efficiency while covering both low and high power ranges with one motor is required, a technology in which one motor may be driven in two different motor driving modes using two inverters and a mode switching switch is being introduced.

Here, one of the different modes is a closed end winding (CEW) mode in which a motor is driven by one inverter using a Y-wiring structure, and the other is an open end winding mode (OEW) in which a motor is driven by two inverters.

In general, switching between the CEW mode and the OEW mode may be determined by a reverse magnetic flux of the motor and a torque of the motor. However, when the motor driving mode is switched at the time point at which a switching condition is satisfied, a torque output from the motor may become unstable as an available voltage of the inverter is rapidly reduced. In order to solve this problem, there is a method of adjusting a switching reference line of maximum efficiency, but this method may cause a reduction in efficiency of a motor driving apparatus.

The information disclosed in the Background section above is to aid in the understanding of the background of the present disclosure, and should not be taken as acknowledgement that this information forms any part of prior art.

SUMMARY

The present disclosure is directed to stabilizing a torque output from a motor upon switching a motor driving mode by linearly adjusting an output voltage level of an inverter for a preset time interval upon switching a motor driving mode.

The technical problems to be solved in the present disclosure are not limited to the above-described technical problems, and other technical problems that are not mentioned will be able to be clearly understood by those skilled in the art to which the present disclosure pertains from the following description.

In order to solve the aforementioned technical problems, a motor driving apparatus may include a motor having a plurality of windings, a dual inverter including a first inverter connected to first ends of the plurality of windings and a second inverter connected to second ends of the plurality of windings and configured to drive the motor through at least one of the first inverter or the second inverter according to a motor driving mode, and a controller configured to determine whether flux weakening control is performed according to an available voltage level of the dual inverter when a switching condition of the motor driving mode is satisfied and to perform the flux weakening control by linearly adjusting an output voltage level of the dual inverter for a preset time interval for which the flux weakening control is performed.

In one embodiment, the preset time interval may correspond to a time interval from a time point at which the switching condition of the motor driving mode is satisfied to a time point at which the motor driving mode is switched.

In one embodiment, the motor driving apparatus may further include a plurality of mode switching switches having first ends connected to the second ends of the plurality of windings and second ends connected to one another. The motor driving mode may include a first driving mode in which the plurality of mode switching switches are turned on and the motor is driven through the first inverter out of the first and second inverters, and a second driving mode in which the plurality of mode switching switches are turned off and the motor is driven through the first and second inverters.

In one embodiment, the switching condition of the motor driving mode may correspond to a switching condition for switching from the second driving mode to the first driving mode.

In one embodiment, the controller may adjust the output voltage level to a voltage limit level of the first driving mode for the preset time interval when the available voltage level exceeds the voltage limit level of the first driving mode, and then switch from the second driving mode to the first driving mode.

In one embodiment, the controller may switch from the second driving mode to the first driving mode without performing the flux weakening control when the available voltage level is smaller than or equal to the voltage limit level of the first driving mode.

In one embodiment, the available voltage level may vary depending on a direct current terminal voltage of the dual inverter and may be set higher in the second driving mode than in the first driving mode.

In one embodiment, the controller may adjust the output voltage level by changing an adjustment factor of the available voltage level for the preset time interval when the flux weakening control is performed.

In one embodiment, the controller may stop an operation of changing the adjustment factor of the available voltage level when the switching condition is not satisfied for the preset time interval.

In addition, in order to solve the aforementioned technical problems, a method of controlling a motor driving apparatus including a dual inverter configured to drive a motor according to a motor driving mode may include determining whether flux weakening control is performed according to an available voltage level of the dual inverter when a switching condition of the motor driving mode is satisfied, and performing the flux weakening control by linearly adjusting an output voltage level of the dual inverter for a preset time interval for which the flux weakening control is performed.

In one embodiment, the preset time interval may correspond to a time interval from a time point at which the switching condition of the motor driving mode is satisfied to a time point at which the motor driving mode is switched.

In one embodiment, the motor driving mode may include a first driving mode in which a neutral point of the motor is formed and the motor is driven through a first inverter out of first and second inverters included in the dual inverter, and a second driving mode in which the neutral point of the motor is not formed and the motor is driven through the first and second inverters.

In one embodiment, the switching condition of the motor driving mode may correspond to a switching condition from the second driving mode to the first driving mode.

In one embodiment, the determining may include determining execution of the flux weakening control when the available voltage level exceeds a voltage limit level of the first driving mode.

In one embodiment, the determining may include determining switching from the second driving mode to the first driving mode without performing the flux weakening control when the available voltage level is smaller than or equal to the voltage limit level of the first driving mode.

In one embodiment, the available voltage level may vary depending on a direct current terminal voltage of the dual inverter and may be set higher in the second driving mode than in the first driving mode.

In one embodiment, the adjusting may include adjusting the output voltage level by changing an adjustment factor of the available voltage level for the preset time interval when the flux weakening control is performed.

In one embodiment, the motor driving apparatus may further include stopping an operation of changing the adjustment factor of the available voltage level when the switching condition is not satisfied for the preset time interval.

According to the present disclosure, it is possible to stabilize the torque output from the motor upon switching the motor driving mode by linearly adjusting the output voltage level of the inverter for the preset time interval upon switching the motor driving mode.

The effects obtainable from the present disclosure are not limited to the above-described effects, and other effects that are not mentioned will be able to be clearly understood by those skilled in the art to which the disclosure pertains from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
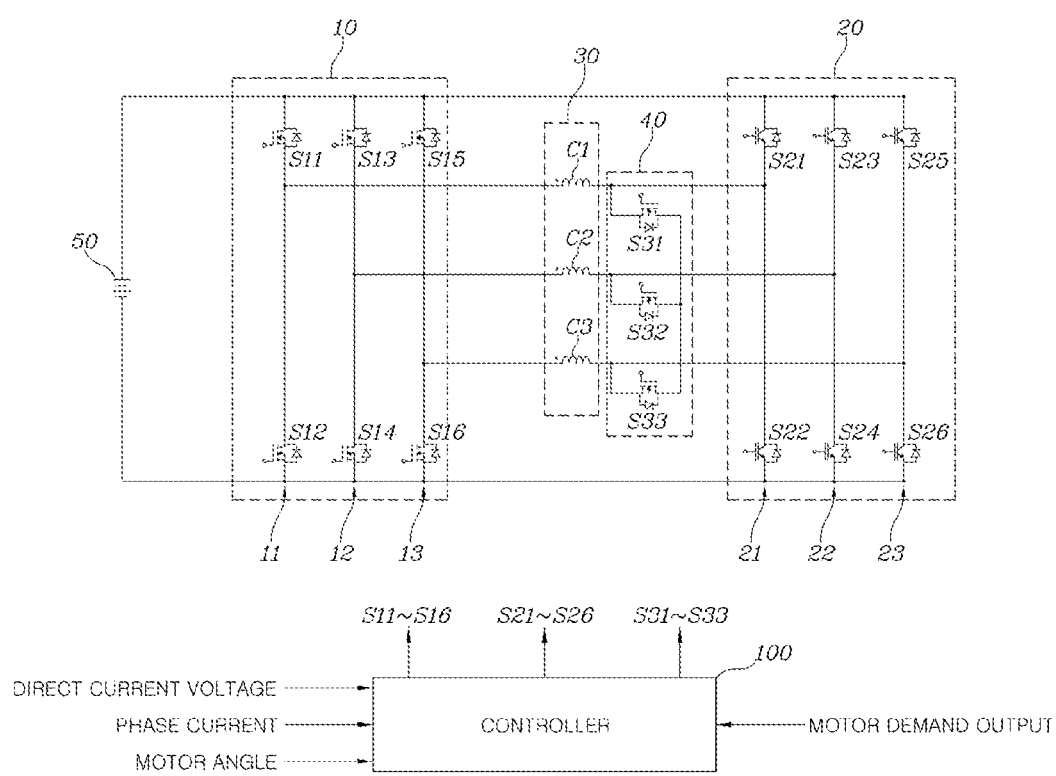
FIG. 1 is a circuit diagram of a motor driving apparatus according to one embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Hereinafter, embodiments disclosed in this specification will be described in detail with reference to the accompanying drawings, and the same or similar components are denoted by the same reference numerals regardless of the drawing symbols, and overlapping descriptions thereof will be omitted. The suffixes "module" and "unit" for components used in the following description are given or used interchangeably in consideration of ease of writing the specification and not have meanings or roles that are distinct from each other by themselves. In addition, in describing the embodiments disclosed in this specification, when it is determined that a detailed description of a related known technology may obscure the gist of the embodiments disclosed in this specification, a detailed description thereof will be omitted. In addition, the accompanying drawings are only for easy understanding of the embodiments disclosed in this specification, and it should be understood that the technical spirit disclosed in this specification is not limited by the accompanying drawings, and all changes, equivalents, or substitutes included in the spirit and technical scope of the present disclosure are included in the accompanying drawings.

Terms including ordinal numbers such as second or first may be used to describe various components, but the components are not limited by the terms. The terms are used only for the purpose of distinguishing one component from another.

When a certain component is described as being "connected" or "coupled" to another component, it is understood that it may be directly connected or coupled to another component or other components may also be disposed therebetween. On the other hand, when a certain component is described as being "directly connected" or "directly coupled" to another component, it should be understood that other components are not present therebetween.

The singular expression includes the plural expression unless the context clearly dictates otherwise.

In the specification, it should be understood that terms such as "comprise" or "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

In addition, a unit or control unit included in the name of a motor control unit (MCU), a hybrid control unit (HCU), or the like is the term widely used for naming a controller for controlling a specific function of a vehicle and does not mean a generic function unit. For example, each controller may include a communication device for communicating with another controller for controlling functions in charge, a memory for storing an operating system, logic commands, input/output information, and the like, and one or more processors for performing determination, calculation, decision, and the like necessary for controlling the functions in charge.

FIG. 1 is a circuit diagram of a motor driving apparatus according to one embodiment of the present disclosure.

Referring to FIG. 1, a motor driving apparatus according to one embodiment of the present disclosure may include a dual inverter 10 and 20, a motor 30 having each of a plurality of windings C1, C2, and C3 corresponding to one of a plurality of phases, a mode switching unit 40, a battery 50, and a controller 100.

The first inverter 10 may include a plurality of first switching elements S11 to S16 connected to one ends of the plurality of windings C1, C2, and C3, and the second inverter 20 may include a plurality of second switching elements S21 to S26 connected to the other ends of the plurality of windings C1, C2, and C3. The mode switching unit 40 may include a plurality of mode switching switches S31, S32, and S33. The controller 100 may control ON/OFF states of the first switching elements S11, S12, S13, S14, S15, and S16, the second switching elements S21, S22, S23, S24, S25, and S26, and the mode switching switches S31, S32, and S33 based on a motor demand output (i.e., a torque command for the motor), a direct current (DC) terminal voltage (i.e., a voltage of the battery) of inverters 10 and 20, a phase current of the motor, and a motor angle.

The first inverter 10 may include a plurality of legs 11, 12, and 13 to which the DC voltage of the battery 50 is applied. Each of the legs 11, 12, and 13 may correspond to one of a plurality of phases of the motor 30 so that electrical connections may be formed. More specifically, the first leg 11 may include two switching elements S11 and S12 connected in series between both ends of the battery 50, and a connection node of the two switching elements S11 and S12 may be connected to one end of the winding C1 of one phase in the motor 30 so that alternating current (AC) power corresponding to one of the plurality of phases is input or output. Likewise, the second leg 12 may include two switching elements S13 and S14 connected in series between both ends of the battery 50, and a connection node of the two switching elements S13 and S14 may be connected to one end of the winding C2 of one phase in the motor 30 so that AC power corresponding to one of the plurality of phases is input or output. In addition, the third leg 13 may include two switching elements S15 and S16 connected in series between both ends of the battery 50, and a connection node of the two switching elements S15 and S16 may be connected to one end of the winding C3 of one phase in the motor 30 so that AC power corresponding to one of the plurality of phases is input or output.

The second inverter 20 may include a plurality of legs 21, 22, and 23 to which the DC voltage of the battery 50 is applied. Each of the legs 21, 22, and 23 may correspond to one of the plurality of phases of the motor 30 so that electrical connections may be formed. More specifically, the first leg 21 may include the two switching elements S21 and S22 connected in series between both ends of the battery 50, and the connection node of the two switching elements S21 and S22 may be connected to the other end of the winding C1 of one phase in the motor 30 so that the AC power corresponding to one of the plurality of phases is input or output. Likewise, the second leg 22 may include the two switching elements S23 and S24 connected in series between both ends of the battery 50, and the connection node of the two switching elements S23 and S24 may be connected to the other end of the winding C2 of one phase in the motor 30 so that the AC power corresponding to one of the plurality of phases is input or output. In addition, the third leg 23 may include the two switching elements S25 and S26 connected in series between both ends of the battery 50, and the connection node of the two switching elements S25 and S26 may be connected to the other end of the winding C3 of one phase in the motor 30 so that the AC power corresponding to one of the plurality of phases is input or output.

The plurality of mode switching switches S31, S32, and S33 may have one ends respectively connected to the plurality of windings C1, C2, and C3 and the other ends connected to one another. The plurality of mode switching switches S31, S32, and S33 may employ various switching devices known in the art, such as a metal oxide semiconductor field effect transistor (MOSFET), an insulated gate bipolar mode transistor (IGBT), a thyristor, and a relay.

Although not illustrated in FIG. 1, the motor driving apparatus may further include so-called Y-capacitor connecting two capacitors connected in series between a positive (+) DC terminal and a negative (−) DC terminal and grounding a connection node between the capacitors.

The controller 100 may control driving of the motor 30 by switching the switching elements S11, S12, S13, S14, S15, S16, S21, S22, S23, S24, S25, and S26 included in the first inverter 10 and the second inverter 20 through pulse width modulation control based on a demand output required for the motor 30.

In addition, the controller 100 may control ON/OFF states of the mode switching switches S31, S32, and S33 included in the mode switching unit 40 according to the motor driving mode. The motor driving mode may include a first driving mode and a second driving mode. In this case, the first driving mode may be referred to as "CEW mode," and the second driving mode may be referred to as "OEW mode."

The dual inverter 10 and 20 may drive the motor 30 through at least one of the first inverter 10 or the second inverter 20 according to the motor driving mode. More specifically, the controller 100 may control the mode switching switches S31, S32, and S33 to be turned on so that the other ends of the plurality of windings C1 to C3 form a neutral point when the CEW mode is performed and drive the motor 30 through the first inverter 10 among the two inverters 10 and 20. In contrast, the controller 100 may control the mode switching switches S31, S32, and S33 to be turned off so that the other ends of the plurality of windings C1 to C3 do not form a neutral point when the OEW mode is performed and drive the motor 30 through the first inverter 10 among the two inverters 10 and 20.

Figure 2:
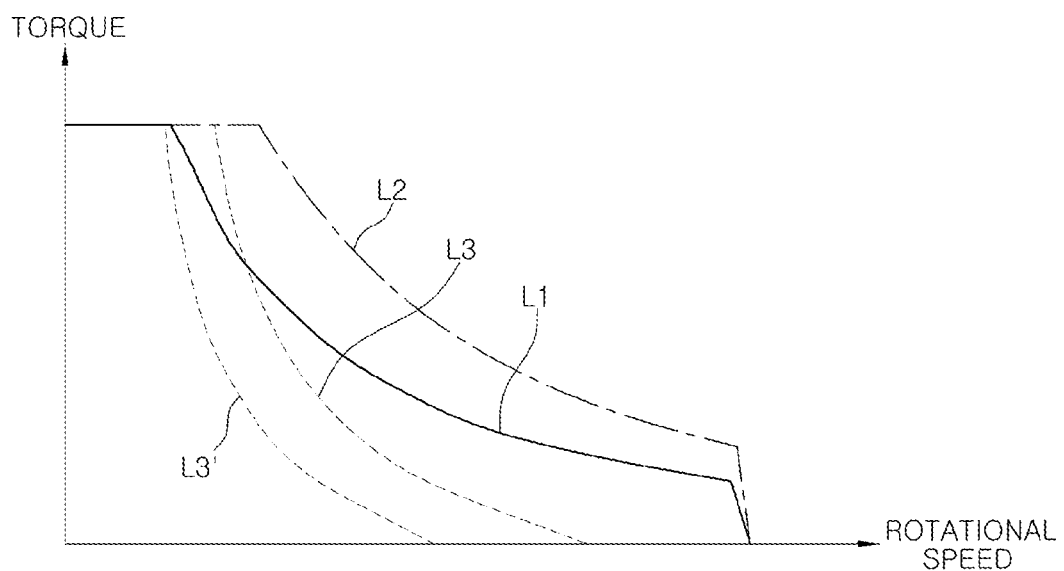
FIG. 2 is a view for describing switching of the motor driving mode according to one embodiment of the present disclosure.

FIG. 2 is a view for describing switching of the motor driving mode according to one embodiment of the present disclosure.

Referring to FIG. 2, an operating point map of the motor indicating an output limit curve L1 of the CEW mode, an output limit curve L2 of the OEW mode, and a mode switching reference line L3 based on an efficiency map is illustrated.

The output limit curves L1 and L2 may indicate an output torque limit value of the motor for each rotational speed (e.g., RPM) of the motor in each motor driving mode. The output limit curve L2 may have an output limit larger than or equal to the output limit curve L1 in at least a portion of an RPM region, and the output limit curves L1 and L2 may be set in consideration of durability, heat generation, current controllability, or the like of the motor and the inverter.

The mode switching reference line L3 based on the efficiency map (not illustrated) may correspond to a boundary line between a high efficiency region of the CEW mode and a high efficiency region of the OEW mode. The efficiency map may include information on a mode with higher efficiency among the CEW mode and the OEW mode in each combination of the torque and reverse magnetic flux of the motor and have the form of a table according to implementation. For example, the efficiency map may be derived based on a result of measuring motor loss according to the rotational speed and the torque of the motor in each motor driving mode for each DC terminal voltage of the inverter through a test. In this case, the reverse magnetic flux of the motor may be inversely proportional to the DC terminal voltage (i.e., the voltage of the battery) of the inverter and proportional to the speed of the motor.

According to the embodiment, the mode switching reference line L3 may have a shape such as L3' according to specifications of the motor driving apparatus. However, the mode switching reference lines L3 and L3' illustrated in FIG. 2 are exemplary, and the present disclosure is not necessarily limited thereto.

In order to switch the motor driving mode according to the mode switching reference line L3, the controller 100 may switch the CEW mode and the OEW mode in both directions according to a value of the torque command and a value of the reverse magnetic flux of the motor with reference to the efficiency map. In this case, the value of the reverse magnetic flux may be calculated based on the torque command of the motor, the DC terminal voltage of the inverter, and the demand speed of the motor. According to the embodiment, the controller 100 may correct the mode switching reference line in consideration of the output limit, hysteresis, or the like for the motor driving mode, and in this case, switch the motor driving mode according to the value of the torque command and the value of the reverse magnetic flux of the motor based on the corrected mode switching reference line.

Hereinafter, a method of controlling the motor driving apparatus for stabilizing the torque output from the motor upon switching the motor driving mode by linearly adjusting the output voltage level of the inverter for a preset time interval upon switching the motor driving mode will be described.

Figure 3:
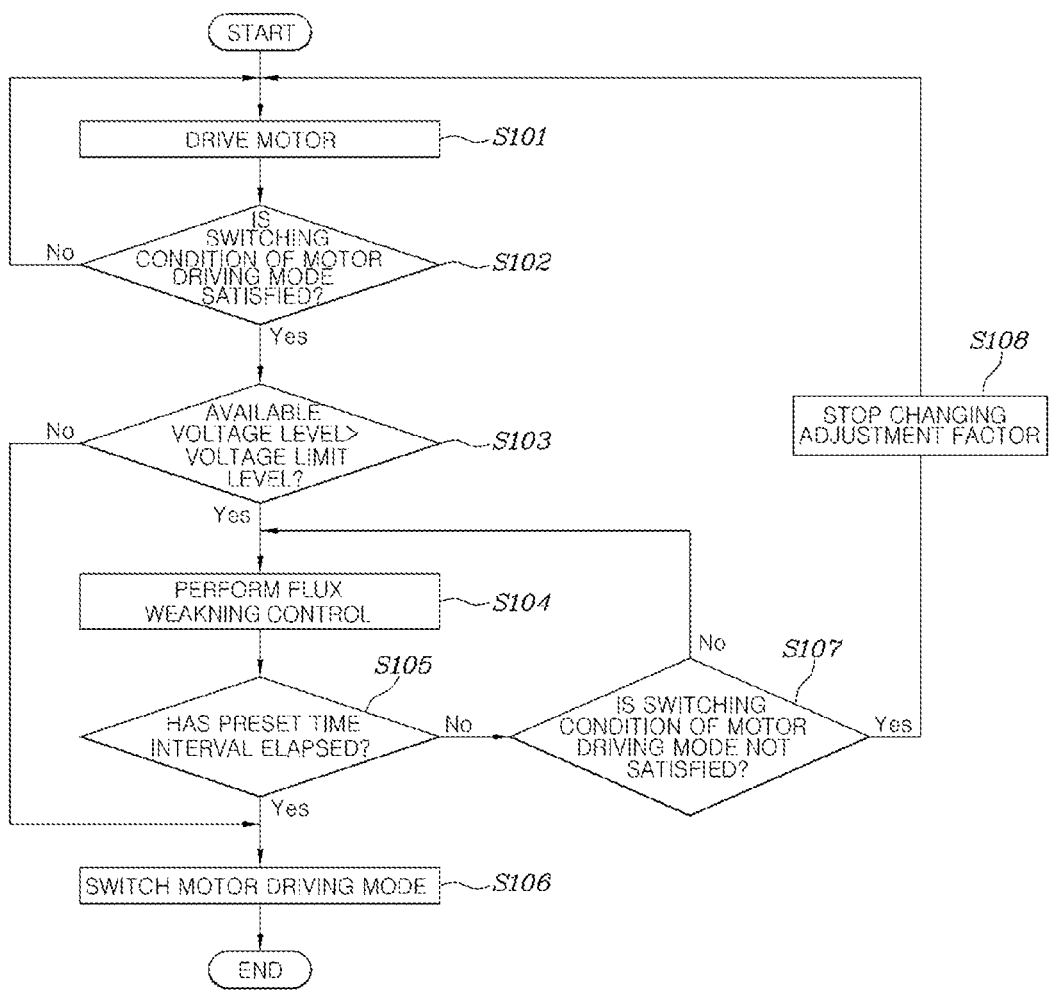
FIG. 3 is a flowchart for describing a method of controlling the motor driving apparatus according to one embodiment of the present disclosure.

FIG. 3 is a flowchart for describing a method of controlling the motor driving apparatus according to one embodiment of the present disclosure.

Referring to FIG. 3, the controller 100 may control driving of the motor 30 through at least one of the first inverter 10 or the second inverter 20 according to the motor driving mode (S101). As described above, the motor driving mode may include the CEW mode and the OEW mode. The CEW mode may correspond to a mode in which the plurality of mode switching switches S31, S32, and S33 are turned on and the motor 30 is driven through the first inverter 10 among the first and second inverters 10 and 20. In contrast, the OEW mode may correspond to a mode in which the plurality of mode switching switches S31, S32, and S33 are turned off and the motor 30 is driven through the first and second inverters 10 and 20.

Thereafter, the controller 100 may determine whether the switching condition of the motor driving mode is satisfied based on the reverse magnetic flux of the motor 30 and the torque of the motor 30 (S102). In the embodiment, the switching condition of the motor driving mode may correspond to the switching condition from the OEW mode to the CEW mode. When the switching condition from the OEW mode to the CEW mode is not satisfied (NO in S102), the controller 100 may maintain the execution of the OEW mode in S101.

When the switching condition of the motor driving mode is satisfied (i.e., when the switching condition from the OEW mode to the CEW mode is satisfied) (YES in S102), the controller 100 may determine whether flux weakening control is performed according to the available voltage levels of the dual inverter 10 and 20 (S103). More specifically, the controller 100 may determine whether the flux weakening control is performed depending on whether the available voltage levels of the dual inverter 10 and 20 exceed the voltage limit level of the CEW mode.

Here, flux weakening control refers to a control scheme that increases the speed range of a motor under given current and voltage limits in the motor driving apparatus. More specifically, when the motor driving conditions exceed a certain torque or a certain speed, the output voltage of the inverters (10, 20) exceeds the available voltage. By appropriately adjusting the output voltage to within the available voltage through the flux weakening control, the speed range of the motor can be expanded. Such control is based on the properties that magnetic flux is proportional to the output voltage and is inversely proportional to torque.

Flux weakening control is performed when the output voltage level is higher than the available voltage level. The region around the operating point where the switching between CEW mode and OEW mode occurs corresponds to a flux weakening control region for CEW mode, and to a non-flux weakening control region for OEW mode.

Therefore, in the present embodiment, flux weakening control is performed to prevent torque shock in the mode switching interval from OEW mode to CEW mode due to a rapid decrease in available voltage level. In other words, when it is determined to perform mode switching in OEW mode, the available voltage level in OEW mode is forcibly reduced to the available voltage level applied to CEW mode for a preset time interval while the flux weakening control is not necessarily performed. By reducing the available voltage level, the output voltage level can be reduced to a level suitable for CEW mode before entering CEW mode.

In this case, the available voltage levels of the dual inverter 10 and 20 may vary depending on the DC terminal voltage (i.e., the voltage of the battery) of the dual inverter 10 and 20 and may be set higher in the OEW mode than in the CEW mode. For example, the available voltage level of the CEW mode may correspond to Vdc (voltage of the battery), and the available voltage level of the OEW mode may correspond to Vdc*√3.

When the available voltage levels of the dual inverter 10 and 20 are smaller than or equal to the voltage limit level of the CEW mode (NO in S103), the controller 100 may switch the OEW mode to the CEW mode without performing the flux weakening control (S106).

In contrast, when the available voltage levels of the dual inverter 10 and 20 exceed the voltage limit level of the CEW mode (YES in S103), the controller 100 may linearly adjust the output voltage levels of the dual inverter 10 and 20 to the voltage limit level of the CEW mode for the preset time interval for which the weak magnetic flux is performed (S104 and S105) and then switch the OEW mode to the CEW mode (S106). In this case, the preset time interval may correspond to a time interval from the time point at which the switching condition of the motor driving mode is satisfied to the time point at which the motor driving mode is switched. In the embodiment, the preset time interval may correspond to the time interval from the time point at which the switching condition from the OEW mode to the CEW mode is satisfied to the time point at which the CEW mode is performed.

More specifically, when the available voltage levels of the dual inverter 10 and 20 exceed the voltage limit level of the CEW mode (YES in S103), the controller 100 may adjust the output voltage levels of the dual inverter 10 and 20 by changing an adjustment factor of the available voltage levels of the dual inverter 10 and 20 (S104). When the OEW mode is performed, the available voltage levels of the dual inverter 10 and 20 may correspond to Vdc*√3*"adjustment factor of the available voltage levels."

Thereafter, the controller 100 may determine whether the preset time interval has elapsed (S105).

When the preset time interval elapses (YES in S105), the controller 100 may switch the OEW mode to the CEW mode (S106).

Before the preset time interval elapses (NO in S105), the controller 100 may determine whether the switching condition (i.e., the switching condition from the OEW mode to the CEW mode) of the motor driving mode is not satisfied (S107).

When the switching condition of the motor driving mode is satisfied (NO in S107), the controller 100 may maintain the execution of the flux weakening control (S104).

When the switching condition of the motor driving mode is not satisfied for the preset time interval (YES in S107), the controller 100 may stop the operation of changing the adjustment factor of the available voltage levels (S108). For example, the controller 100 may change the adjustment factor of the available voltage level to "1" at the time point at which the switching condition of the motor driving mode is not satisfied. Therefore, the controller 100 can prevent the flux weakening control from being performed in a region in which the switching condition of the motor driving mode is not satisfied.

Meanwhile, unlike the embodiment in which the flux weakening control is performed for the preset time interval, a method of performing the flux weakening control while a current reverse magnetic flux of the motor is in a range close to the mode switching reference line may be considered, but according to the method, since the current reverse magnetic flux of the motor may be continuously in the range close to the mode switching reference line, efficiency of the motor driving apparatus can be reduced.

Figure 4:
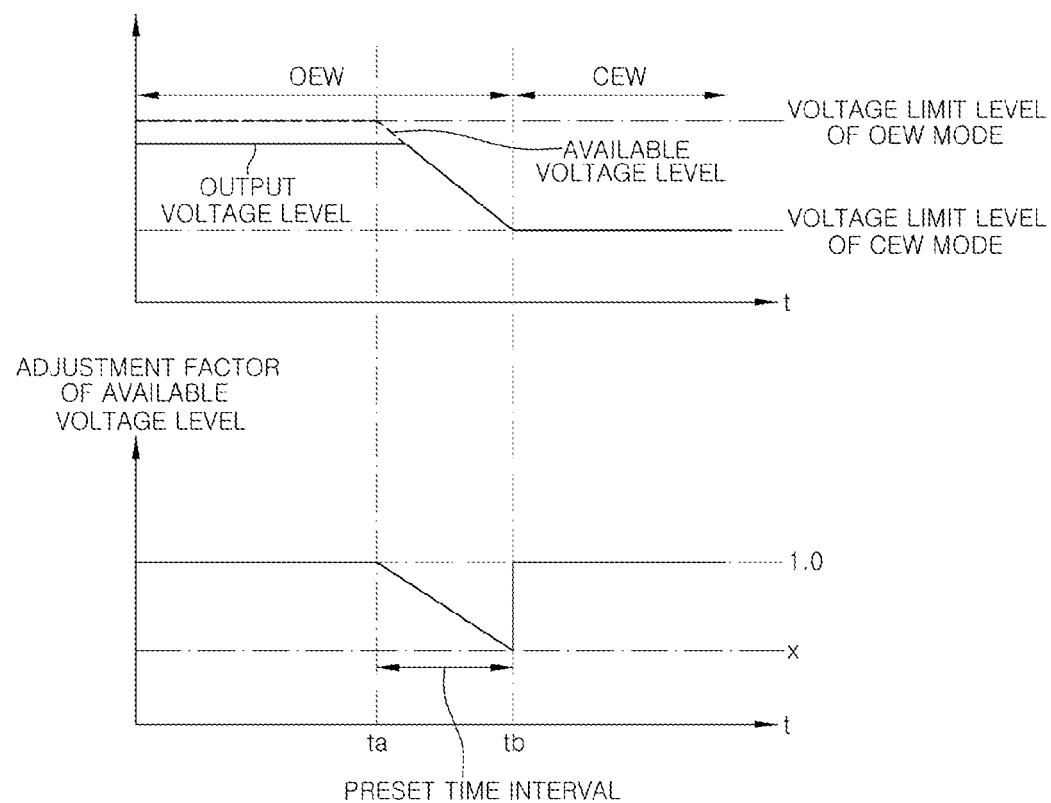
FIGS. 4 and 5 are views for describing a process in which the motor driving mode according to one embodiment of the present disclosure is switched.
Figure 5:
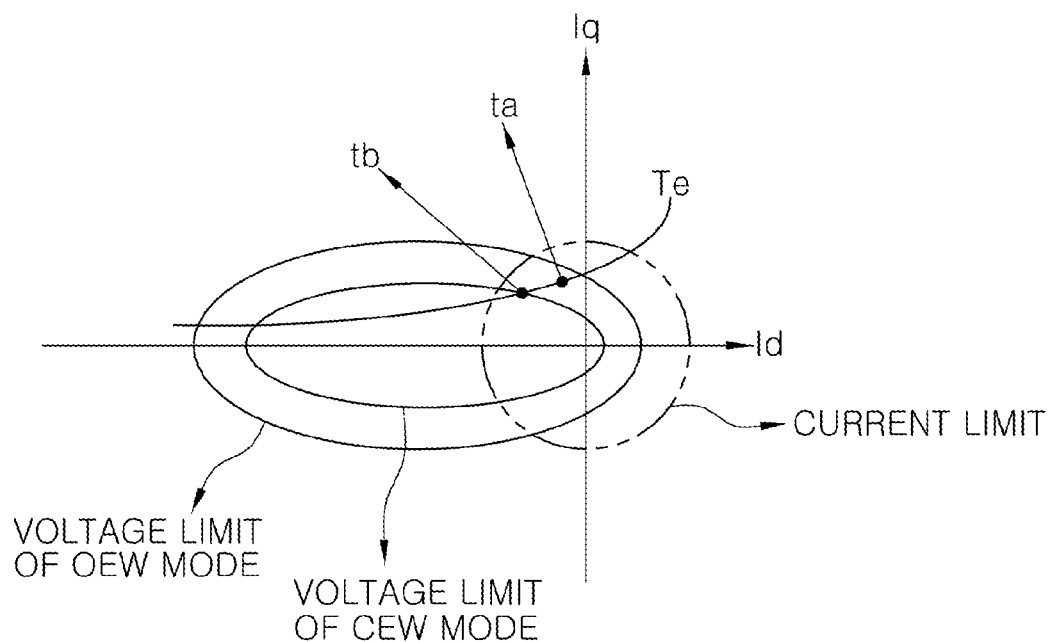

FIGS. 4 and 5 are views for describing a process in which the motor driving mode according to one embodiment of the present disclosure is switched.

Referring to FIG. 4, at a time point ta, the controller 100 may determine that the switching condition from the OEW mode to the CEW mode is satisfied. The controller 100 may linearly decrease the adjustment factor of the available voltage level from "1.0" to "x" for an interval from the time point ta to a time point tb (i.e., the preset time interval). Thereafter, at the time point tb, the controller 100 may non-linearly increase the adjustment factor of the available voltage level from "x" to "1.0" and switch the motor driving mode from the OEW mode to the CEW mode.

In this case, the adjustment factor of the available voltage level may be adjusted in a direction in which the available voltage level decreases to the voltage limit level of the CEW mode for the preset time interval. "x" and the preset time interval may be variously set according to embodiments. In addition, as the predetermined time interval for which the flux weakening control is performed increases, a change in the torque of the motor decreases, but the efficiency of the motor driving device can be reduced.

Referring to FIG. 5, a view in which the operating points of the dual inverter 10 and 20 are moved along a constant torque curve Te for the present time interval (time interval from the time point ta to the time point tb) is illustrated. At the time point ta, the operating points of the dual inverter 10 and 20 are positioned on the constant torque curve Te, and for the preset time interval (time interval from the time point ta to the time point tb), the operating points of the dual inverter 10 and 20 may be linearly moved to the voltage limit of the CEW mode.

Meanwhile, the above-described present disclosure may be implemented as computer-readable codes on a medium on which a program is recorded. The computer-readable recording medium includes any type of recording media in which data that may be read by a computer system are stored. Examples of the computer-readable media include a hard disk drive (HDD), a solid state disk (SSD), a silicon disk drive (SDD), a read only memory (ROM), a random access memory (RAM), a CD-ROM, a magnetic tape, a floppy disk, an optical data storage device, etc. Therefore, the above detailed description should not be construed as limiting in all respects and should be considered illustrative. The scope of the present disclosure should be determined by reasonable construction of the appended claims, and all changes within the equivalent scope of the present disclosure are included in the scope of the present disclosure.

What is claimed is:

1. A motor driving apparatus comprising:
   a motor having a plurality of windings;
   a dual inverter including a first inverter connected to first ends of the plurality of windings and a second inverter connected to second ends of the plurality of windings, and configured to drive the motor through at least one of the first inverter or the second inverter according to motor driving modes; and
   a controller configured to, when a switching condition between the motor driving modes having mutually different available voltage levels is satisfied, determine whether to perform flux weakening control based on an available voltage level, and perform the flux weakening control by adjusting the available voltage level of the dual inverter so that an output voltage level of the dual inverter is adjusted to the available voltage level.

2. The motor driving apparatus of claim 1, wherein the flux weakening control is performed for a preset time interval corresponding to a time interval from a time point at which the switching condition between the motor driving modes is satisfied to a time point at which one of the motor driving modes is switched.

3. The motor driving apparatus of claim 1, further comprising a plurality of mode switching switches having first ends connected to the second ends of the plurality of windings, respectively, and second ends connected to one another,
   wherein the motor driving modes include:
   a first driving mode in which the plurality of mode switching switches are turned on and the motor is driven through the first inverter out of the first and second inverters; and
   a second driving mode in which the plurality of mode switching switches are turned off and the motor is driven through the first and second inverters.

4. The motor driving apparatus of claim 3, wherein the switching condition corresponds to a switching condition for switching from the second driving mode to the first driving mode.

5. The motor driving apparatus of claim 4, wherein the controller is further configured to:
   adjust the output voltage level to a voltage limit level of the first driving mode for a preset time interval when the available voltage level exceeds the voltage limit level of the first driving mode; and
   switch from the second driving mode to the first driving mode.

6. The motor driving apparatus of claim 4, wherein the controller is further configured to switch from the second driving mode to the first driving mode without performing the flux weakening control when the available voltage level is smaller than or equal to a voltage limit level of the first driving mode.

7. The motor driving apparatus of claim 3, wherein the available voltage level varies depending on a direct current terminal voltage of the dual inverter and is set higher in the second driving mode than in the first driving mode.

8. The motor driving apparatus of claim 1, wherein the controller is further configured to adjust the output voltage level by changing an adjustment factor of the available voltage level for a preset time interval when the flux weakening control is performed.

9. The motor driving apparatus of claim 8, wherein the controller is further configured to stop an operation of changing the adjustment factor of the available voltage level when the switching condition is not satisfied for the preset time interval.

10. A method of controlling a motor driving apparatus including a dual inverter configured to drive a motor according to motor driving modes, the method comprising:
   determining, when a switching condition between the motor driving modes having mutually different available voltage levels is satisfied, whether to perform flux weakening control based on an available voltage level; and
   performing the flux weakening control by adjusting the available voltage level of the dual inverter so that an output voltage level of the dual inverter is adjusted to the available voltage level.

11. The method of claim 10, wherein the flux weakening control is performed for a preset time interval corresponding to a time interval from a time point at which the switching condition between the motor driving modes is satisfied to a time point at which one of the motor driving modes is switched.

12. The method of claim 10, wherein the motor driving modes include:
   a first driving mode in which a neutral point of the motor is formed and the motor is driven through a first inverter out of first and second inverters included in the dual inverter; and
   a second driving mode in which the neutral point of the motor is not formed and the motor is driven through the first and second inverters.

13. The method of claim 12, wherein the switching condition corresponds to a switching condition from the second driving mode to the first driving mode.

14. The method of claim 13, wherein the determining includes determining execution of the flux weakening control when the available voltage level exceeds a voltage limit level of the first driving mode.

15. The method of claim 13, wherein the determining includes determining switching from the second driving mode to the first driving mode without performing the flux weakening control when the available voltage level is smaller than or equal to a voltage limit level of the first driving mode.

16. The method of claim 12, wherein the available voltage level varies depending on a direct current terminal voltage of the dual inverter and is set higher in the second driving mode than in the first driving mode.

17. The method of claim 10, wherein the adjusting includes adjusting the output voltage level by changing an adjustment factor of the available voltage level for a preset time interval when the flux weakening control is performed.

18. The method of claim 17, further comprising stopping an operation of changing the adjustment factor of the available voltage level when the switching condition is not satisfied for the preset time interval.

* * * * *